United States Patent [19]
Wellener, III et al.

[11] Patent Number: 5,516,078
[45] Date of Patent: May 14, 1996

[54] GAS CYLINDER VALVE WITH NON-PERFORATED DIAPHRAGMS

[75] Inventors: Paul L. Wellener, III, Pittsburgh; Alan F. Dunn, Houston; James R. Daniels, McDonald, all of Pa.

[73] Assignee: Amcast Industrial Corporation, Washington, Pa.

[21] Appl. No.: 291,380

[22] Filed: Aug. 16, 1994

[51] Int. Cl.⁶ ................................................. F16K 31/00
[52] U.S. Cl. ........................................ 251/335.2; 251/266
[58] Field of Search ................................. 251/335.2, 266

[56] References Cited

U.S. PATENT DOCUMENTS

| | | | |
|---|---|---|---|
| 2,061,028 | 11/1936 | Forbes et al. | 251/335.2 |
| 3,979,105 | 9/1976 | Pool et al. | 251/335.2 |
| 4,231,549 | 11/1980 | Visalli | 251/335.2 |
| 4,671,490 | 6/1987 | Kolene et al. | 251/335.2 |
| 4,706,929 | 11/1987 | Kalaskie et al. | 251/14 |
| 4,750,709 | 6/1988 | Kolene et al. | 251/335.2 |
| 4,776,562 | 10/1988 | Kalaskie et al. | 251/63.4 |
| 4,828,219 | 4/1989 | Ohmi et al. | 251/118 |
| 5,037,066 | 8/1991 | Kerger et al. | 251/335.2 |

FOREIGN PATENT DOCUMENTS

0418557A1  8/1990  Germany.

OTHER PUBLICATIONS

Céodeux, *Robinetterie The Valvemakers*, Operating Instructions for High Pressure Gas Cylinder Diaphragm Valve; Dated Apr. 2, 1991; pp. 1–6.

*Primary Examiner*—A. Michael Chambers
*Attorney, Agent, or Firm*—Richard V. Westerhoff; Eckert Seamans Cherin & Mellott

[57] ABSTRACT

A gas cylinder valve with minimum wetted area has a one-piece valving assembly comprising a valve member, a non-perforated diaphragm member and a valve stem, the latter including a threaded stud and a stem shaft threaded on to the stud. The threaded stud, diaphragm member and valve member are fused together by a YAG laser weld applied through a central, blind bore in the valve member. Another through weld is applied around the peripheral edge of the threaded stud. A rim on the stem shaft clamps the diaphragm outside the peripheral weld through a pair of washers which absorb the torsional load. A helical compression spring bears on a valve stem shaft shoulder outside the wetted area to bias the valve open. A resilient bushing supported by a metal cup backs up the diaphragm member.

20 Claims, 5 Drawing Sheets

GAS CYLINDER VALVE WITH NON-PERFORATED DIAPHRAGMS

BACKGROUND OF THE INVENTION

1. Field of the Invention

This invention relates to valves used to seal and to control the flow of gas from gas cylinders. In particular, the invention relates to such valves in which the surface area of the valve exposed to gas discharged from the gas cylinder is minimized.

2. Background of Information

Many types of gases are transported in, stored in and discharged from gas cylinders. Commonly, the valves used on high pressure gas cylinders have a set of diaphragms which isolate the valve member from an actuating stem. A spring within the valve chamber biases the valve member to an open position. The stem is actuated by a hand wheel or an automatic actuator such as a pneumatic actuator. Examples of such cylinder valves are described in U.S. Pat. No. 4,706,929 and 4,776,562. In such a valve, the valve member, the diaphragms and the actuating stem bear against but are not fixed to each other, as the spring pushes the parts to the valve open position and the stem pushes them to the closed position.

In some applications, the gas dispensed from the gas cylinder must remain free of impurities. This is especially true in the semiconductor industry where any impurities in the gas can adversely affect the electrical properties of the device and can greatly decrease the manufacturing yield.

It has been found that the spring which is in the wetted area of the above described gas cylinder valves generates particulates which are discharged with the gas or which accumulate in the wetted areas of the valve and are discharged in bursts.

To eliminate the particulates generated by the spring located in the wetted area, a valve has been offered which eliminates the spring entirely. In that valve, the actuating stem is connected to a pneumatic actuator by a tongue and groove connection. Without the spring in the valve chamber, the valve member must be physically pulled to the open position. This requires connecting the valve member, diaphragms and actuating stem together so that when the valve stem is pulled, the diaphragms and valve member follow. In the above described valve, the valve member has an integral threaded stud which extends through central apertures in the diaphragms and the parts are fused together by a weld extending around the periphery of the threaded stud. The valve stem screws down onto the threaded stud to connect the valve stem to the valve member. Such a valve requires an exemption for use with highly toxic gases such as those used in the semiconductor industry as the Department of Transportation (DOT) prohibits the use of perforated diaphragms in such applications.

There is a need for an improved cylinder valve which is non-particulating.

More particularly, there is a need for a cylinder valve in which the wetted area within the valve is minimized.

There is a related need for such a cylinder valve in which the usual spring is removed from the wetted area, but preferably still provided in the valve to bias the valve to the open position.

There is a further need for such a valve without a spring in the wetted area in which the valve member, diaphragms and valve stem are fused together so that that the valve member may be pulled open, but in which the diaphragms are non-perforated.

There is an additional need for such a cylinder valve in which the weld by which the parts are fused together is isolated from the stresses developed in the diaphragms as they flex during operation of the cylinder valve so that the cycle life of the diaphragms can be maximized.

SUMMARY OF THE INVENTION

These needs and others are satisfied by the invention which is directed to an improved non-particulating gas cylinder valve in which the spring is removed from the wetted area, yet may preferably still be provided outside the wetted area to bias the valve to the open position. With the spring removed from the wetted area, the wetted area can be minimized and made less susceptible to the collection of particulates. The valve member is fixed to the diaphragm member and the valve stem so that the valve member can be pulled to the open position; however, this is accomplished without perforation of the one or more diaphragms which make up the diaphragm member. Thus, no DOT exemption is required for use of the valve with toxic or other hazardous gases.

The valve member, the non-perforated diaphragm member and a threaded stud which is part of the valve stem, are fused together to form a one-piece valving assembly, preferably by a laser weld made through a central, blind bore in the valve member. Also preferably, the threaded stud is further welded to the non-perforated diaphragm member and the valve member by a laser weld around the peripheral edge of the threaded stud. The valve stem also includes a stem shaft with a threaded axial bore which is threaded onto the threaded stud. Preferably, this axial bore in the stem shaft is counterbored to form an annular rim radially spaced from the stud. This annular rim clamps the diaphragm member against the valve member to reduce the transmission of stresses developed in the diaphragm member during flexure to the weld area. In the preferred design, a pair of washers are placed between the rim on the stem shaft and the diaphragm to minimize transmission to the weld area of the torsional forces developed during tightening of the stem shaft on the stud.

The valve body has an elongated bore forming the valve chamber in which the valve member moves against an inlet passage to close the valve and away from the inlet passage to open the valve for communication with an outlet passage. The elongated bore has a counterbore forming an annular ledge on which the diaphragm member is seated. The diaphragm member forms a flexible pressure retaining wall of the valve chamber opposite the inlet passage. The diaphragm member is clamped against the annular ledge by an assembly which includes a bonnet threaded into the counterbore of the elongated bore in the valve body. Preferably this assembly also includes a cup which holds a resilient bushing supporting the diaphragm. This cup has an annular skirt which the bonnet clamps down onto the diaphragm member. Preferably, this cup has an annular recess into which the resilient bushing is deformed to accommodate deflection of the diaphragm member.

The spring for biasing the valve to the open position is located in the counterbore in the elongated bore in the valve body outside the wetted area. Preferably, the spring is a helical compression spring which bears against a radial shoulder on the valve stem shaft and the end wall of the cup to bias the valve member to the open position.

In another embodiment of the gas cylinder valve of the invention the spring is eliminated, and the valve stem shaft has means on a distal end for engaging a valve actuator which imparts reciprocal movement to the valve stem shaft to move the valve member between the open and closed positions. In this embodiment, the valve stem shaft can have a first section which is threaded onto the stud, and a second section which engages the actuator. The two sections are coupled together, preferably by a transverse undercut groove in one of the sections and a complimentary tang in the other engaging the groove.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
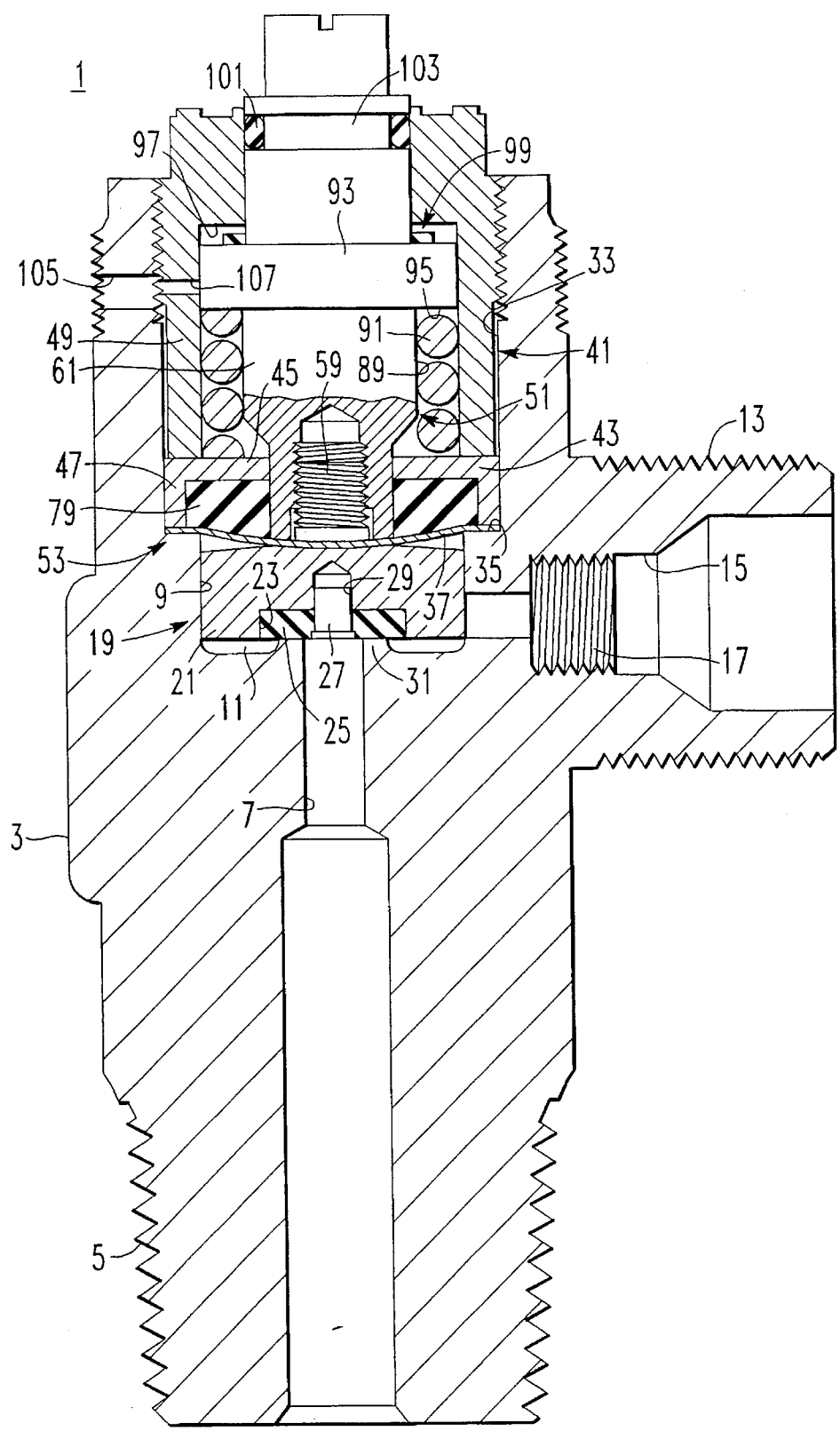
FIG. 1 is a longitudinal sectional view through a gas cylinder valve in accordance with the invention shown in the closed position.

A high pressure gas cylinder valve i in accordance with the invention is shown in FIG. 1. The valve 1 includes a valve body 3 having external threads 5 at one end for securing the valve 1 to a high pressure gas cylinder (not shown). A longitudinal bore in the valve body 3 forms an inlet passage 7 which communicates with a concentric elongated bore 9 extending inward from the opposite end of the valve body 3 to form a valve chamber 11. A transverse flared bore through the valve body 3 and an externally threaded boss 13 form an outlet passage 15 which also communicates with the valve chamber 11. The outlet passage 15 is provided with internal threads 17 for receiving an optional flow limiting device (not shown). The threaded boss 13 is sized to form the appropriate Compressed Gas Association (CGA) connection for the gas being delivered. Standard connection designs are assigned to various gases to avoid misconnections which could result in hazardous conditions.

A valve member 19 longitudinally slidable in the valve chamber 11 comprises a seat holder 21 having a recess 23 facing the inlet passage 7 for a valve insert 25. The valve insert is held in place by a seat holder stud 27 which is press fit into a central, blind bore 29 in the seat holder 21. The valve seat insert 25 seals against a raised valve body seat 31 surrounding the intersection of the inlet passage 7 with the valve chamber 11 when the valve is closed as shown in FIG. 1.

The elongated bore 9 in the valve body 3 has a threaded counterbore 33 forming an annular ledge 35 concentric with the valve chamber 11. A diaphragm member 37 comprising a set of diaphragms 39 (see FIG. 2) is clamped against this annular ledge 35 by an assembly 41 which includes an inverted cup 43 (see FIG. 3) having an end wall 45 and a cylindrical skirt 47 which bears against the diaphragm member 37, and an externally threaded bonnet 49 which screws down into the threaded counterbore 33. The diaphragm member 37 forms a flexible wall which seals off the valve chamber 11. A valve stem 51 is located in the counterbore 33 above the diaphragm member 37.

Figure 2:
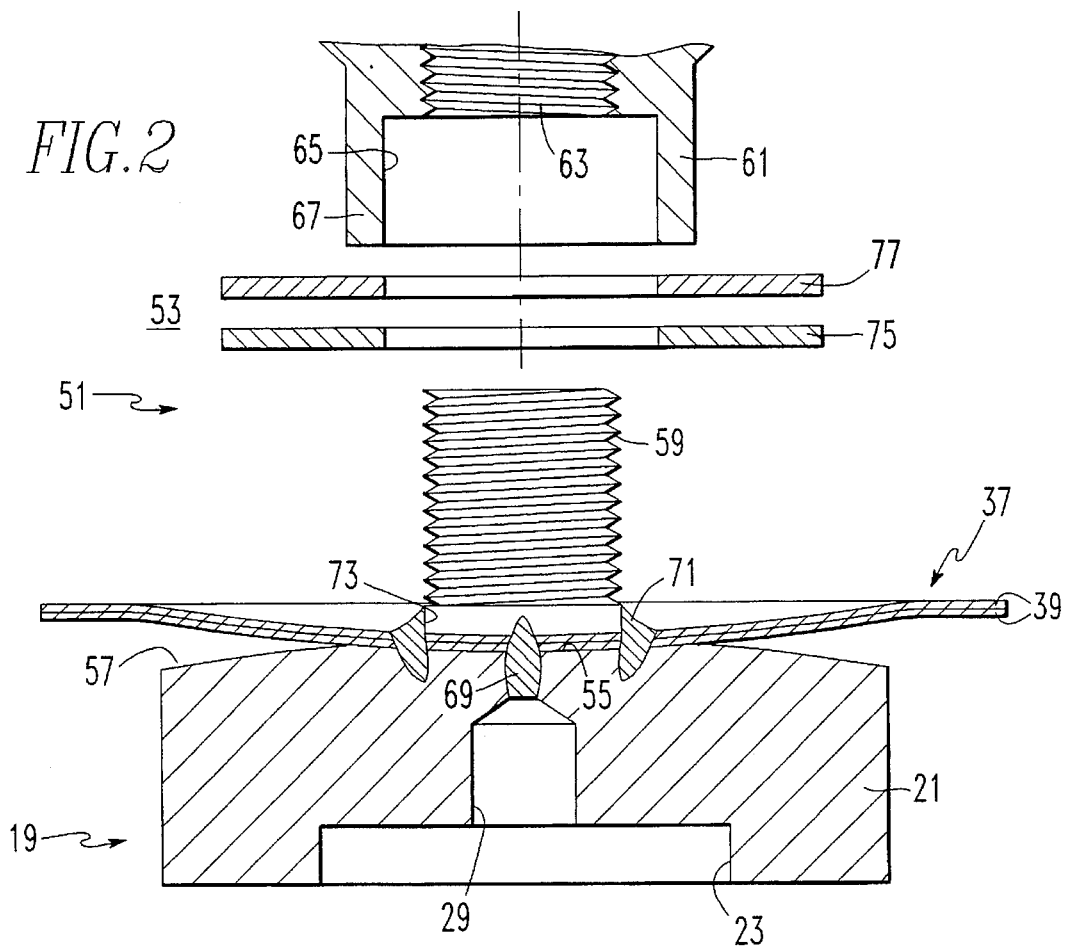
FIG. 2 is an exploded side view, partially in section, and in enlarged scale, of a valving assembly which forms part of the valve of FIG. 1.
Figure 4:
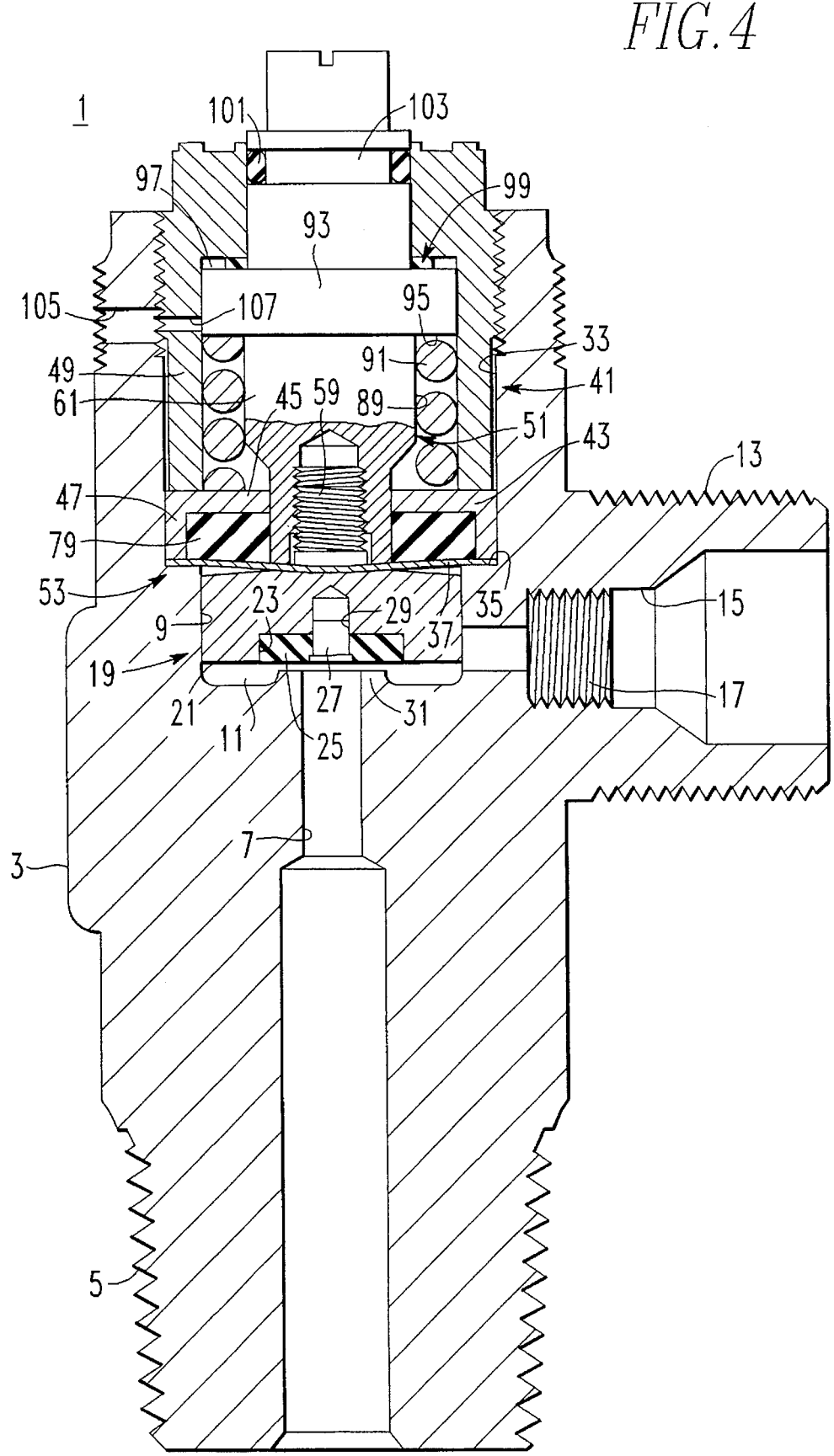
FIG. 4 is a longitudinal sectional view similar to FIG. 1 showing the valve in the open position.

As best understood from FIG. 2, the valve member 19, the diaphragm member 37 and the valve stem 51 are fused together to form a one-piece valving assembly 53 without perforation of the diaphragms 39 making up the diaphragm member 37. The surface of the seat holder 21 of the valve member 19 confronting the diaphragms 39 has a central depression 55 which generally conforms to the curvature of the diaphragm member 37 when flexed to the closed position as shown in FIG. 1. The peripheral portion 57 of the surface of the seat holder 21 is convex upward with the approximate curvature of the diaphragm member 37 when flexed to the valve open position as shown in FIG. 4.

The valve stem 51 includes a threaded stud 59 and a stem shaft 61 having a threaded axial bore 63 into which the stud 59 is threaded. The bore 63 is counterbored at 65 to form an annular rim 67 which is radially spaced from the stud 59.

The seat holder 21, non-perforated diaphragms 39 and the threaded stud 59 are fused into the one-piece valving assembly 53 by welding, and preferably by a YAG laser weld 69 applied through the blind bore 29 in the seat holder 21. This weld fuses these parts together without perforating the diaphragms 39. An additional YAG laser weld 71 is applied 360° around the peripheral edge 73 of the threaded stud 59. This weld 71 also fuses all three elements without perforating the diaphragms 39.

The number of diaphragms 39 in the diaphragm member 37 will vary as a function of the valve size, choice of materials, design pressure, and other factors. In the exemplary valve 1, the diaphragms 39 are made of MP35N alloy available from the Latrobe Steel Company. MP35N is an alloy of cobalt, nickel and chromium which has a good fatigue life suitable for the repeated flexing of the diaphragms against the high pressure of the gas in the cylinder. Preferably, the seat holder 21 and threaded stud 59 are made of Hastelloy C alloy. Hastelloy C is a nickel, molybdenum and chromium alloy. These components could be made of other suitable materials, such as for instance, 316L stainless steel.

After the threaded stud 59, diaphragms 39 and seat holder 21 are fused together into the one-piece valving assembly 53, the stem shaft 61 is threaded down onto the threaded stud 59. The annular rim 67 on the stem shaft 61 clamps the diaphragms 39 against the seat holder 21 radially outward of the weld 71. This reduces the stresses applied to the weld 71 by flexure of the diaphragms 39 during opening and closing of the valve. A pair or more of washers 75 and 77, preferably made of beryllium copper, are placed between the annular rim 67 and the diaphragms 39 to isolate the welds from the torsional stresses developed by screwing the stem shaft 61 down to clamp the diaphragms 39. Calculations indicate that while stresses of 200,000 psi are developed in the outer portions of the diaphragms 39 where they flex, the stress on the weld 71 is only about 40,000 psi.

In order to support the diaphragms 39, a resilient bushing 79 is provided in the cup 43. A resilient material such as, for instance Buna N or Nitrile, can be used for the resilient bushing 79. As seen best in FIG. 3, the end wall 45 of the cup has a generally V-shaped annular recess 81 having an inner wall 83 making an angle of about 10° with the inner surface of the end wall, and an outer wall 85 making an angle of about 30° with the cup end wall. This recess accommodates deformation of the resilient bushing 79 with opening of the valve.

The end wall 45 of the cup 43 also has a central aperture 87 through which the stem shaft 61 extends. The stem shaft 61 flares outward above the cup 43 to form with the bonnet 49 an annular space 89 in which a helical compression spring 91 is seated. A radial flange 93 on the stem shaft 61 provides a guide for the stem shaft and also forms a shoulder 95 against which the spring 91 bears. The other end of the spring 91 bears against the radially extending shoulder formed by the end wall 45 of the cup 43. Since the valve stem 51, diaphragm member 37 and valve member 19 form a one-piece valving assembly 53, the spring 91 bearing on the shoulder 95 biases the valve to the open position shown in FIG. 4. The radial flange 93 cooperates with a radially inward flange 97 on the bonnet 49 to form an upward stop for the one-piece valve assembly 53. The actual open position of the valve is determined by a spacer 99. An O ring 101 seated in an annular recess 103, seals the upper end of the stem shaft 61. Radial bores 105 in the valve body 3 and 107 in the bonnet 49 vent the annular space 89.

Figure 5:
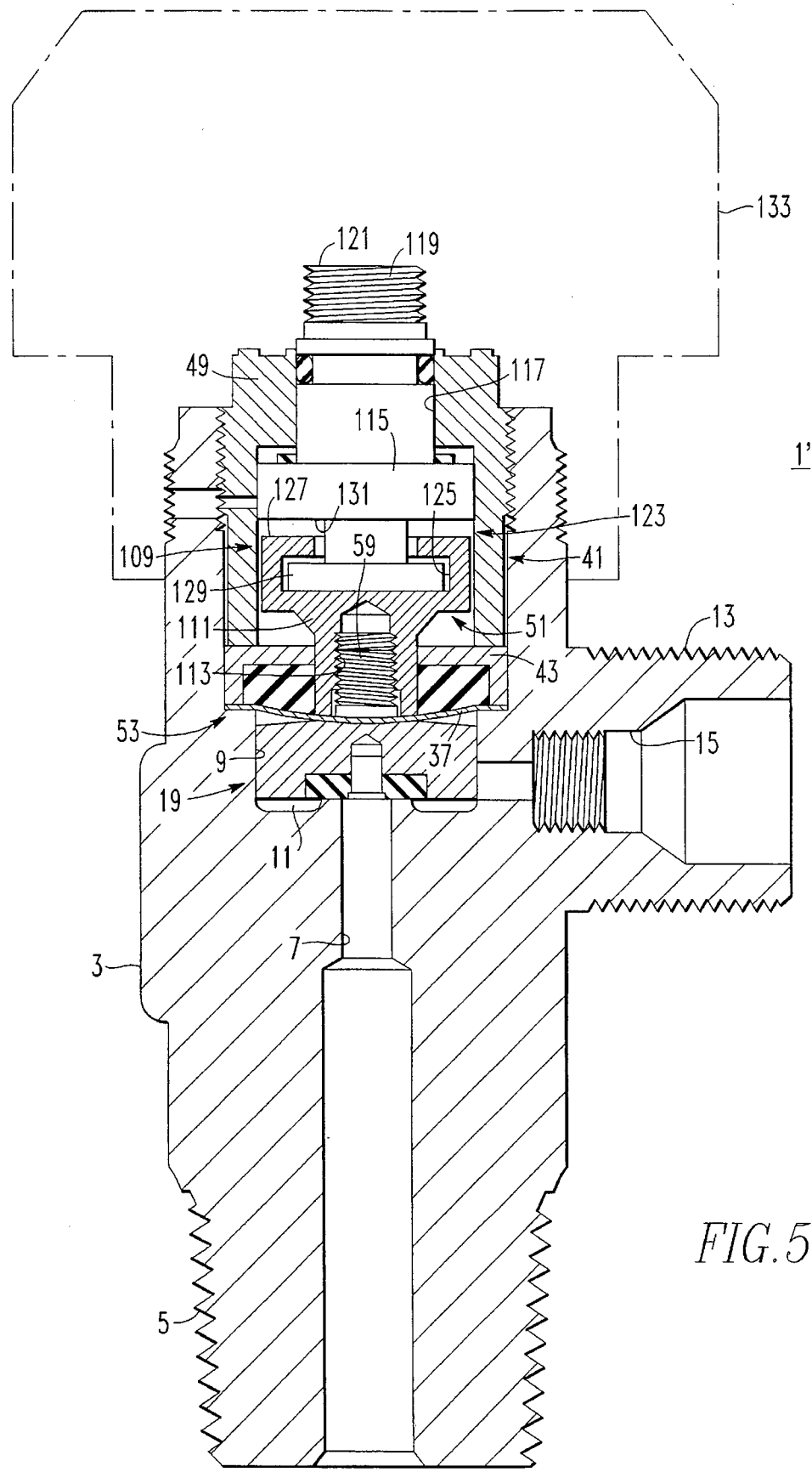
FIG. 5 is a longitudinal sectional view through another embodiment of the invention.

FIG. 5 illustrates another embodiment of the gas cylinder valve 1 of the invention which eliminates the helical compression spring 91. Parts common to the embodiment of FIGS. 1–4 are shown with like reference characters. In this modified gas cylinder valve 1', the stem shaft 109 is formed in two sections. A first, lower section 111 has the threaded bore 113 which is threaded onto the threaded stud 59. The second section 115 of the stem shaft 109 extends through a central bore 117 in the bonnet 49 and has external threads 119 on a distal end 121.

The two sections 111 and 115 of stem shafts 109 are connected by a coupling 123. In its preferred form, the coupling 123 comprises a transverse undercut groove 125 in the upper end 127 of the stem shaft section 111. The coupling 123 also includes a complimentary circular tang 129 on a lower end 131 of the second section 115 of the stem shaft 109. Alternatively, the groove can be provided in the lower end 131 of the stem shaft second section 115 and the tang can be provided on the upper end 127 of the first valve stem shaft section 111. In either event, the coupling 123 transmits both tension and compression forces from the second valve stem shaft section 115 to the first section 111 for opening and closing the valve member 19. The circular tang 129 permits these tension and compression forces to be transmitted between the valve stem shaft sections 115 and (1) without the transmission of torsional forces.

The external threads 119 on the distal end 121 of the second section 115 of the stem shaft 109 are adapted to engage the valve actuator 133. This valve actuator may be a pneumatic actuator such as that shown in U.S. Pat. No. 4,776,562. Other types of actuators may be utilized to impart the reciprocal movement of the valve stem shaft 109. Similar actuators can also be utilized to operate the gas cylinder valve illustrated in FIGS. 1–4.

Either of the embodiments shown in FIGS. 1–4 and in FIG. 5 can be modified to be operated manually rather than by an actuator. Thus, as shown in the partial view of FIG. 6, the central bore 117 in the bonnet 49 can be threaded at 135, and the portion of the valve stem shaft 137 extending through the bore 117 can be provided with external threads 139 engaging the threads 135. The distal end 141 of the stem shaft 137 projecting beyond the bonnet 49 is then provided with a connection such as a square head 143, or other suitable connection, for engagement by a handwheel 145 for manually applying a torque to the stem shaft 137 to open and close the valve member 19.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A gas cylinder valve for gas cylinders containing compressed gases, said gas cylinder valve comprising:

a valve body having a valve chamber and an inlet passage and an outlet passage each communicating with said valve chamber;

a valve member movable in said valve chamber between a closed position in which said valve member seats against said inlet passage, and an open position in which said valve member is spaced from said inlet passage;

a non-perforated diaphragm member forming a flexible wall of said valve chamber opposite said inlet passage; and valve stem means reciprocally movable in said valve body, said valve member, said non-perforated diaphragm member and said valve stem means being fused together with said non-perforated diaphragm member between said valve member and said valve stem means to form a one-piece valving assembly without perforation of said diaphragm member such that reciprocal movement of said valve stem means moves said valve member between said open position and said closed position.

2. The gas cylinder valve of claim 1 wherein said valve member has a central, axially extending, blind bore therein through which said valve member is fused with said diaphragm member and said valve stem means to form said one-piece valving assembly.

3. The gas cylinder valve of claim 2 wherein said valve stem means comprises a threaded stud which is fused to said diaphragm member and said valve member through said blind bore in said valve member, and a stem shaft having a threaded axial bore by which said stem shaft is threaded onto said threaded stud.

4. The gas cylinder valve of claim 1 wherein said threaded stud has a peripheral edge fused to said diaphragm member and said valve member, wherein said threaded axial bore of said stem shaft is counterbored to form an annular rim radially spaced from said threaded stud, said annular rim clamping said diaphragm member against said valve member radially outward of said stud when said stem shaft is threaded onto said threaded stud.

5. A gas cylinder valve of claim 3 adapted for actuation by a valve actuator and wherein said stem shaft has a means on a distal end adapted for engaging said valve actuator.

6. The gas cylinder of claim 5 wherein said stem shaft has a first section having said threaded axial bore into which said threaded stud is threaded, a second section having said means on said distal end for engaging said valve actuator and coupling means coupling said first and second sections together for said reciprocal movement of said valve stem by said valve actuator.

7. The gas cylinder valve of claim 6 wherein said coupling means comprises a transverse undercut groove in one of said first and second sections of said valve stem shaft and a complementary tang on the other of said first and second sections of said valve stem shaft engaging said transverse undercut groove.

8. The gas cylinder valve of claim 5 wherein said valve body has an elongated bore forming said valve chamber and having a counterbore forming an annular ledge, and means within said counterbore including a bonnet threaded into said counterbore and clamping said diaphragm member against said ledge, said bonnet having a central threaded bore and said stem shaft extending through and having external threads engaging said central threaded bore in said bonnet.

9. The gas cylinder valve of claim 3 wherein said valve body has an elongated bore forming said valve chamber and having a counterbore forming an annular ledge, and means within said counterbore including a bonnet threaded into said counterbore and clamping said diaphragm member against said annular ledge, said stem shaft extending through said bonnet and having an annular shoulder thereon, and a compression spring bearing against said annular shoulder to bias said valve stem shaft, and therefore said threaded stud, diaphragm member and valve member to said open position.

10. The gas cylinder valve of claim 9 wherein said means within said counterbore further includes a cup between said bonnet and said diaphragm member having a cylindrical skirt which seats on said diaphragm member and having an end wall with a central aperture through which said valve stem shaft extends, said compression spring beating against said end wall and said annular shoulder on said stem shaft, and a resilient bushing inside said cup providing support for said diaphragm member.

11. The gas cylinder valve of claim 10 wherein said end wall of said cup has an annular recess into which said resilient bushing is deformed when said valve member is in said open position deflecting said diaphragm member away from said inlet passage.

12. The gas cylinder valve of claim 1 wherein said valve stem means has an annular edge contacting said diaphragm member, and wherein said valve stem means is fused to said diaphragm member around said annular edge.

13. The gas cylinder valve of claim 12 wherein said valve stem means comprises a threaded stud which is fused to said diaphragm member and said valve member through said blind bore in said valve member and forming said annular edge which is fused to said diaphragm member, and a stem shaft having a threaded axial bore by which said stem shaft is threaded onto said threaded stud.

14. The gas cylinder valve of claim 13 wherein said threaded axial bore in said stem shaft is counterbored to form an annular rim radially spaced from said threaded stud and which clamps said diaphragm member against said valve member when said stem shaft is threaded onto said threaded stud.

15. The gas cylinder valve of claim 14 wherein said valve stem means includes a plurality of washers between said rim and said diaphragm member and against which said stem shaft is threaded to clamp said diaphragm member against said valve member.

16. A gas cylinder valve for a gas cylinder containing compressed gas, said cylinder valve comprising:

a valve body having an elongated bore forming a valve chamber and a counterbore in said elongated bore forming an annular ledge adjacent said valve chamber, said valve body also having an inlet passage communicating with said valve chamber and aligned with said elongated bore and an outlet passage also communicating with said valve chamber;

a valve member movable in said valve chamber between a closed position in which said valve member seats against said inlet passage, and an open position in which said valve member is spaced from said inlet passage;

a diaphragm member seated on said annular ledge and forming a flexible wall of said valve chamber opposite said inlet passage such that said counterbore is outside said valve chamber;

a bonnet means threadedly engaging said counterbore to clamp said diaphragm member against said annular ledge;

a valve stem reciprocally movable in said counterbore outside said valve chamber and fused to said diaphragm member and said valve member such that said valve stem, said diaphragm member and said valve member move as a one-piece valving assembly between said open and closed positions of said valve member; and spring means in said counterbore outside said valve chamber, engaging said valve stem and biasing said valve member to said open position.

17. The gas cylinder valve of claim 16 wherein said valve stem has a radially outwardly extending shoulder, wherein said bonnet means includes a radially extending shoulder between said radially outwardly extending shoulder on said valve stem and said diaphragm member, and wherein said spring means comprises a compression spring bearing against said radially outwardly extending shoulder on said valve stem and against said radially extending surface on said bonnet means.

18. The gas cylinder valve of claim 17 wherein said bonnet means includes a cup having an end wall forming said radially extending surface against which said compression spring bears, a central aperture through which said valve stem means extends and a peripheral skirt which seats on said diaphragm member, and wherein said bonnet means further includes a bonnet clamping said cup against said diaphragm member seated on said annular ledge.

19. The gas cylinder valve of claim 18 further including a resilient bushing in said cup supporting said diaphragm member.

20. The gas cylinder valve of claim 19 wherein said end wall of said cup has an annular recess facing said diaphragm member and into which said resilient bushing is deformed when said valve stem is actuated to move said valve member to said open position.

* * * * *

UNITED STATES PATENT AND TRADEMARK OFFICE
CERTIFICATE OF CORRECTION

PATENT NO. : 5,516,078
DATED : May 14, 1996
INVENTOR(S) : Paul L. Wellener, et al.

It is certified that error appears in the above-identified patent and that said Letters Patent is hereby corrected as shown below:

Please delete columns 1 - 8 and substitute columns 1- 8 as per attached.

Signed and Sealed this

Fifteenth Day of April, 1997

Attest:

BRUCE LEHMAN

*Attesting Officer*   *Commissioner of Patents and Trademarks*

GAS CYLINDER VALVE WITH NON-PERFORATED DIAPHRAGMS

BACKGROUND OF THE INVENTION

1. Field of the Invention

This invention relates to valves used to seal and to control the flow of gas from gas cylinders. In particular, the invention relates to such valves in which the surface area of the valve exposed to gas discharged from the gas cylinder is minimized.

2. Background of Information

Many types of gases are transported in, stored in and discharged from gas cylinders. Commonly, the valves used on high pressure gas cylinders have a set of diaphragms which isolate the valve member from an actuating stem. A spring within the valve chamber biases the valve member to an open position. The stem is actuated by a hand wheel or an automatic actuator such as a pneumatic actuator. Examples of such cylinder valves are described in U.S. Pat. No. 4,706,929 and 4,776,562. In such a valve, the valve member, the diaphragms and the actuating stem bear against but are not fixed to each other, as the spring pushes the parts to the valve open position and the stem pushes them to the closed position.

In some applications, the gas dispensed from the gas cylinder must remain free of impurities. This is especially true in the semiconductor industry where any impurities in the gas can adversely affect the electrical properties of the device and can greatly decrease the manufacturing yield.

It has been found that the spring which is in the wetted area of the above described gas cylinder valves generates particulates which are discharged with the gas or which accumulate in the wetted areas of the valve and are discharged in bursts.

To eliminate the particulates generated by the spring located in the wetted area, a valve has been offered which eliminates the spring entirely. In that valve, the actuating stem is connected to a pneumatic actuator by a tongue and groove connection. Without the spring in the valve chamber, the valve member must be physically pulled to the open position. This requires connecting the valve member, diaphragms and actuating stem together so that when the valve stem is pulled, the diaphragms and valve member follow. In the above described valve, the valve member has an integral threaded stud which extends through central apertures in the diaphragms and the parts are fused together by a weld extending around the periphery of the threaded stud. The valve stem screws down onto the threaded stud to connect the valve stem to the valve member. Such a valve requires an exemption for use with highly toxic gases such as those used in the semiconductor industry as the Department of Transportation (DOT) prohibits the use of perforated diaphragms in such applications.

There is a need for an improved cylinder valve which is non-particulating.

More particularly, there is a need for a cylinder valve in which the wetted area within the valve is minimized.

There is a related need for such a cylinder valve in which the usual spring is removed from the wetted area, but preferably still provided in the valve to bias the valve to the open position.

There is a further need for such a valve without a spring in the wetted area in which the valve member, diaphragms and valve stem are fused together so that that the valve member may be pulled open, but in which the diaphragms are non-perforated.

There is an additional need for such a cylinder valve in which the weld by which the parts are fused together is isolated from the stresses developed in the diaphragms as they flex during operation of the cylinder valve so that the cycle life of the diaphragms can be maximized.

SUMMARY OF THE INVENTION

These needs and others are satisfied by the invention which is directed to an improved non-particulating gas cylinder valve in which the spring is removed from the wetted area, yet may preferably still be provided outside the wetted area to bias the valve to the open position. With the spring removed from the wetted area, the wetted area can be minimized and made less susceptible to the collection of particulates. The valve member is fixed to the diaphragm member and the valve stem so that the valve member can be pulled to the open position; however, this is accomplished without perforation of the one or more diaphragms which make up the diaphragm member. Thus, no DOT exemption is required for use of the valve with toxic or other hazardous gases.

The valve member, the non-perforated diaphragm member and a threaded stud which is part of the valve stem, are fused together to form a one-piece valving assembly, preferably by a laser weld made through a central, blind bore in the valve member. Also preferably, the threaded stud is further welded to the non-perforated diaphragm member and the valve member by a laser weld around the peripheral edge of the threaded stud. The valve stem also includes a stem shaft with a threaded axial bore which is threaded onto the threaded stud. Preferably, this axial bore in the stem shaft is counterbored to form an annular rim radially spaced from the stud. This annular rim clamps the diaphragm member against the valve member to reduce the transmission of stresses developed in the diaphragm member during flexure to the weld area. In the preferred design, a pair of washers are placed between the rim on the stem shaft and the diaphragm to minimize transmission to the weld area of the torsional forces developed during tightening of the stem shaft on the stud.

The valve body has an elongated bore forming the valve chamber in which the valve member moves against an inlet passage to close the valve and away from the inlet passage to open the valve for communication with an outlet passage. The elongated bore has a counterbore forming an annular ledge on which the diaphragm member is seated. The diaphragm member forms a flexible pressure retaining wall of the valve chamber opposite the inlet passage. The diaphragm member is clamped against the annular ledge by an assembly which includes a bonnet threaded into the counterbore of the elongated bore in the valve body. Preferably this assembly also includes a cup which holds a resilient bushing supporting the diaphragm. This cup has an annular skirt which the bonnet clamps down onto the diaphragm member. Preferably, this cup has an annular recess into which the resilient bushing is deformed to accommodate deflection of the diaphragm member.

The spring for biasing the valve to the open position is located in the counterbore in the elongated bore in the valve body outside the wetted area. Preferably, the spring is a helical compression spring which bears against a radial shoulder on the valve stem shaft and the end wall of the cup to bias the valve member to the open position.

In another embodiment of the gas cylinder valve of the invention the spring is eliminated, and the valve stem shaft has means on a distal end for engaging a valve actuator which imparts reciprocal movement to the valve stem shaft to move the valve member between the open and closed positions. In this embodiment, the valve stem shaft can have a first section which is threaded onto the stud, and a second section which engages the actuator. The two sections are coupled together, preferably by a transverse undercut groove in one of the sections and a complimentary tang in the other engaging the groove.

BRIEF DESCRIPTION OF THE DRAWINGS

A full understanding of the invention can be gained from the following description of the preferred embodiments when read in conjunction with the accompanying drawings in which:

FIG. 1 is a longitudinal sectional view through a gas cylinder valve in accordance with the invention shown in the closed position.

FIG. 2 is an exploded side view, partially in section, and in enlarged scale, of a valving assembly which forms part of the valve of FIG. 1.

Figure 3:
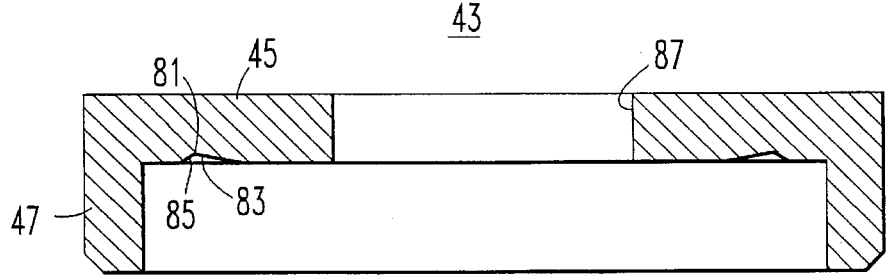
FIG. 3 is a cross sectional view in enlarged scale through a cup forming part of the valve of FIG. 1.

FIG. 3 is a cross sectional view in enlarged scale through a cup forming part of the valve of FIG. 1.

FIG. 4 is a longitudinal sectional view similar to FIG. 1 showing the valve in the open position.

FIG. 5 is a longitudinal sectional view through another embodiment of the invention.

Figure 6:
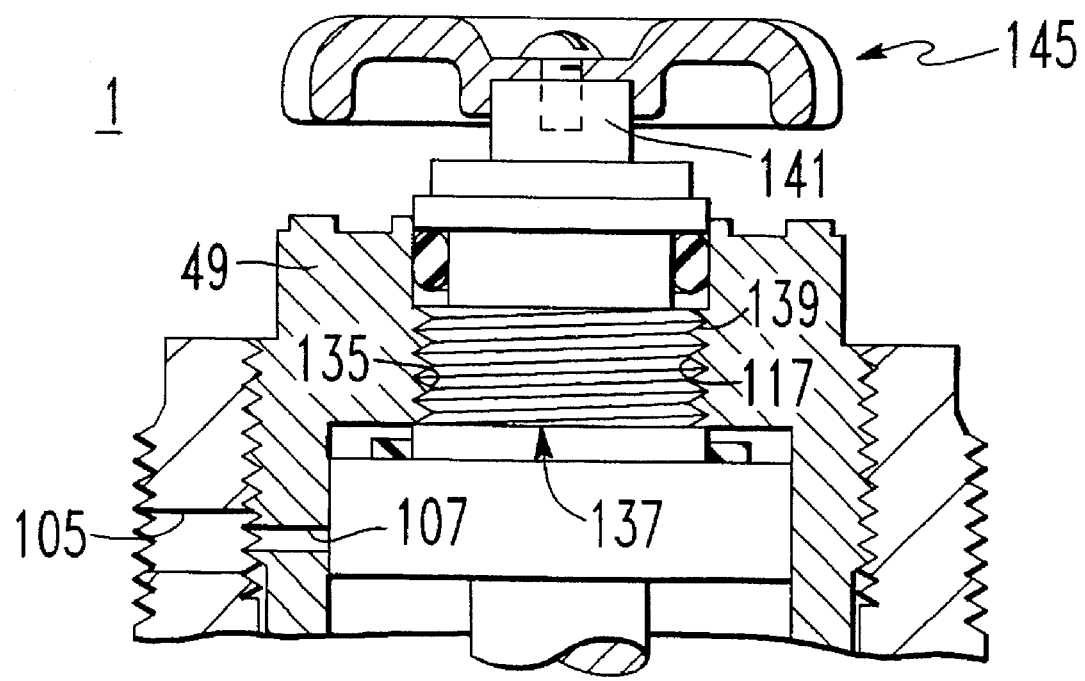
FIG. 6 is a partial longitudinal sectional view illustrating a variation to both of the above embodiments.

FIG. 6 is a partial longitudinal sectional view illustrating a variation to both of the above embodiments.

DESCRIPTION OF THE PREFERRED EMBODIMENTS

A high pressure gas cylinder valve 1 in accordance with the invention is shown in FIG. 1. The valve 1 includes a valve body 3 having external threads 5 at one end for securing the valve 1 to a high pressure gas cylinder (not shown). A longitudinal bore in the valve body 3 forms an inlet passage 7 which communicates with a concentric elongated bore 9 extending inward from the opposite end of the valve body 3 to form a valve chamber 11. A transverse flared bore through the valve body 3 and an externally threaded boss 13 form an outlet passage 15 which also communicates with the valve chamber 11. The outlet passage 15 is provided with internal threads 17 for receiving an optional flow limiting device (not shown). The threaded boss 13 is sized to form the appropriate Compressed Gas Association (CGA) connection for the gas being delivered. Standard connection designs are assigned to various gases to avoid misconnections which could result in hazardous conditions.

A valve member 19 longitudinally slidable in the valve chamber 11 comprises a seat holder 21 having a recess 23 facing the inlet passage 7 for a valve insert 25. The valve insert is held in place by a seat holder stud 27 which is press fit into a central, blind bore 29 in the seat holder 21. The valve seat insert 25 seals against a raised valve body seat 31 surrounding the intersection of the inlet passage 7 with the valve chamber 11 when the valve is closed as shown in FIG. 1.

The elongated bore 9 in the valve body 3 has a threaded counterbore 33 forming an annular ledge 35 concentric with the valve chamber 11. A diaphragm member 37 comprising a set of diaphragms 39 (see FIG. 2) is clamped against this annular ledge 35 by an assembly 41 which includes an inverted cup 43 (see FIG. 3) having an end wall 45 and a cylindrical skirt 47 which bears against the diaphragm member 37, and an externally threaded bonnet 49 which screws down into the threaded counterbore 33. The diaphragm member 37 forms a flexible wall which seals off the valve chamber 11. A valve stem 51 is located in the counterbore 33 above the diaphragm member 37.

As best understood from FIG. 2, the valve member 19, the diaphragm member 37 and the valve stem 51 are fused together to form a one-piece valving assembly 53 without perforation of the diaphragms 39 making up the diaphragm member 37. The surface of the seat holder 21 of the valve member 19 confronting the diaphragms 39 has a central depression 55 which generally conforms to the curvature of the diaphragm member 37 when flexed to the closed position as shown in FIG. 1. The peripheral portion 57 of the surface of the seat holder 21 is convex upward with the approximate curvature of the diaphragm member 37 when flexed to the valve open position as shown in FIG. 4.

The valve stem 51 includes a threaded stud 59 and a stem shaft 61 having a threaded axial bore 63 into which the stud 59 is threaded. The bore 63 is counterbored at 65 to form an annular rim 67 which is radially spaced from the stud 59.

The seat holder 21, non-perforated diaphragms 39 and the threaded stud 59 are fused into the one-piece valving assembly 53 by welding, and preferably by a YAG laser weld 69 applied through the blind bore 29 in the seat holder 21. This weld fuses these parts together without perforating the diaphragms 39. An additional YAG laser weld 71 is applied 360° around the peripheral edge 73 of the threaded stud 59. This weld 71 also fuses all three elements without perforating the diaphragms 39.

The number of diaphragms 39 in the diaphragm member 37 will vary as a function of the valve size, choice of materials, design pressure, and other factors. In the exemplary valve 1, the diaphragms 39 are made of MP35N alloy available from the Latrobe Steel Company. MP35N is an alloy of cobalt, nickel and chromium which has a good fatigue life suitable for the repeated flexing of the diaphragms against the high pressure of the gas in the cylinder. Preferably, the seat holder 21 and threaded stud 59 are made of Hastelloy C alloy. Hastelloy C is a nickel, molybdenum and chromium alloy. These components could be made of other suitable materials, such as for instance, 316L stainless steel.

After the threaded stud 59, diaphragms 39 and seat holder 21 are fused together into the one-piece valving assembly 53, the stem shaft 61 is threaded down onto the threaded stud 59. The annular rim 67 on the stem shaft 61 clamps the diaphragms 39 against the seat holder 21 radially outward of the weld 71. This reduces the stresses applied to the weld 71 by flexure of the diaphragms 39 during opening and closing of the valve. A pair or more of washers 75 and 77, preferably made of beryllium copper, are placed between the annular rim 67 and the diaphragms 39 to isolate the welds from the torsional stresses developed by screwing the stem shaft 61 down to clamp the diaphragms 39. Calculations indicate that while stresses of 200,000 psi are developed in the outer portions of the diaphragms 39 where they flex, the stress on the weld 71 is only about 40,000 psi.

In order to support the diaphragms 39, a resilient bushing 79 is provided in the cup 43. A resilient material such as, for instance Buna N or Nitrile, can be used for the resilient bushing 79. As seen best in FIG. 3, the end wall 45 of the cup has a generally V-shaped annular recess 81 having an inner wall 83 making an angle of about 10° with the inner surface of the end wall, and an outer wall 85 making an angle of about 30° with the cup end wall. This recess accommodates deformation of the resilient bushing 79 with opening of the valve.

The end wall 45 of the cup 43 also has a central aperture 87 through which the stem shaft 61 extends. The stem shaft 61 flares outward above the cup 43 to form with the bonnet 49 an annular space 89 in which a helical compression spring 91 is seated. A radial flange 93 on the stem shaft 61 provides a guide for the stem shaft and also forms a shoulder 95 against which the spring 91 bears. The other end of the spring 91 bears against the radially extending shoulder formed by the end wall 45 of the cup 43. Since the valve stem 51, diaphragm member 37 and valve member 19 form a one-piece valving assembly 53, the spring 91 bearing on the shoulder 95 biases the valve to the open position shown in FIG. 4. The radial flange 93 cooperates with a radially inward flange 97 on the bonnet 49 to form an upward stop for the one-piece valve assembly 53. The actual open position of the valve is determined by a spacer 99. An O ring 101 seated in an annular recess 103, seals the upper end of the stem shaft 61. Radial bores 105 in the valve body 3 and 107 in the bonnet 49 vent the annular space 89.

FIG. 5 illustrates another embodiment of the gas cylinder valve 1 of the invention which eliminates the helical compression spring 91. Parts common to the embodiment of FIGS. 1–4 are shown with like reference characters. In this modified gas cylinder valve 1', the stem shaft 109 is formed in two sections. A first, lower section 111 has the threaded bore 113 which is threaded onto the threaded stud 59. The second section 115 of the stem shaft 109 extends through a central bore 117 in the bonnet 49 and has external threads 119 on a distal end 121.

The two sections 111 and 115 of stem shafts 109 are connected by a coupling 123. In its preferred form, the coupling 123 comprises a transverse undercut groove 125 in the upper end 127 of the stem shaft section 111. The coupling 123 also includes a complimentary circular tang 129 on a lower end 131 of the second section 115 of the stem shaft 109. Alternatively, the groove can be provided in the lower end 131 of the stem shaft second section 115 and the tang can be provided on the upper end 127 of the first valve stem shaft section 111. In either event, the coupling 123 transmits both tension and compression forces from the second valve stem shaft section 115 to the first section 111 for opening and closing the valve member 19. The circular tang 129 permits these tension and compression forces to be transmitted between the valve stem shaft sections 115 and (1) without the transmission of torsional forces.

The external threads 119 on the distal end 121 of the second section 115 of the stem shaft 109 are adapted to engage the valve actuator 133. This valve actuator may be a pneumatic actuator such as that shown in U.S. Pat. No. 4,776,562. Other types of actuators may be utilized to impart the reciprocal movement of the valve stem shaft 109. Similar actuators can also be utilized to operate the gas cylinder valve illustrated in FIGS. 1–4.

Either of the embodiments shown in FIGS. 1–4 and in FIG. 5 can be modified to be operated manually rather than by an actuator. Thus, as shown in the partial view of FIG. 6, the central bore 117 in the bonnet 49 can be threaded at 135, and the portion of the valve stem shaft 137 extending through the bore 117 can be provided with external threads 139 engaging the threads 135. The distal end 141 of the stem shaft 137 projecting beyond the bonnet 49 is then provided with a connection such as a square head 143, or other suitable connection, for engagement by a handwheel 145 for manually applying a torque to the stem shaft 137 to open and close the valve member 19.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A gas cylinder valve for gas cylinders containing compressed gases, said gas cylinder valve comprising:
    a valve body having a valve chamber and an inlet passage and an outlet passage each communicating with said valve chamber;
    a valve member movable in said valve chamber between a closed position in which said valve member seats against said inlet passage, and an open position in which said valve member is spaced from said inlet passage;
    a non-perforated diaphragm member forming a flexible wall of said valve chamber opposite said inlet passage; and
    valve stem means reciprocally movable in said valve body, said valve member, said non-perforated diaphragm member and said valve stem means being fused together with said non-perforated diaphragm member between said valve member and said valve stem means to form a one-piece valving assembly without perforation of said diaphragm member such that reciprocal movement of said valve stem means moves said valve member between said open position and said closed position.

2. The gas cylinder valve of claim 1 wherein said valve member has a central, axially extending, blind bore therein through which said valve member is fused with said diaphragm member and said valve stem means to form said one-piece valving assembly.

3. The gas cylinder valve of claim 2 wherein said valve stem means comprises a threaded stud which is fused to said diaphragm member and said valve member through said blind bore in said valve member, and a stem shaft having a threaded axial bore by which said stem shaft is threaded onto said threaded stud.

4. The gas cylinder valve of claim 3 wherein said valve body has an elongated bore forming said valve chamber and having a counterbore forming an annular ledge, and means within said counterbore including a bonnet threaded into said counterbore and clamping said diaphragm member against said annular ledge, said stem shaft extending through said bonnet and having an annular shoulder thereon, and a compression spring bearing against said annular shoulder to bias said valve stem shaft, and therefore said threaded stud, diaphragm member and valve member to said open position.

5. The gas cylinder valve of claim 4 wherein said means within said counterbore further includes a cup between said bonnet and said diaphragm member having a cylindrical skirt which seats on said diaphragm member and having an end wall with a central aperture through which said valve stem shaft extends, said compression spring bearing against said end wall and said annular shoulder on said stem shaft, and a resilient bushing inside said cup providing support for said diaphragm member.

6. The gas cylinder valve of claim 5 wherein said end wall of said cup has an annuar recess into which said resilient bushing is deformed when said valve member is in said open position deflecting said diaphragm member away from said inlet passage.

7. The gas cylinder valve of claim 6 wherein said threaded stud has a pheripheral edge fused to said diaphragm member and said valve member, wherein said threaded axial bore of said stem shaft is counterbored to form an annular rim radially spaced from said threaded stud, said annular rim clamping said diaphragm member against said valve member radially outward of said stud when said stem shaft is threaded onto said threaded stud.

8. A gas cylinder valve of claim 3 adapted for actuation by a valve actuator and wherein said stem shaft has a means on a distal end adapted for engaging said valve actuator.

9. The gas cylinder of claim 8 wherein said stem shaft has a first section having said threaded axial bore into which said threaded stud is threaded, a second section having said means on said distal end for engaging said valve actuator and coupling means coupling said first and second sections together for said reciprocal movement of said valve stem by said valve actuator.

10. The gas cylinder valve of claim 9 wherein said coupling means comprises a transverse undercut groove in one of said first and second sections of said valve stem shaft and a complementary tang on the other of said first and second sections of said valve stem shaft engaging said transverse undercut groove.

11. The gas cylinder valve of claim 8 wherein said valve body has an elongated bore forming said valve chamber and having a counterbore forming an annular ledge, and means within said counterbore including a bonnet threaded into said counterbore and clamping said diaphragm member against said ledge, said bonnet having a central threaded bore and said stem shaft extending through and having external threads engaging said central threaded bore in said bonnet.

12. The gas cylinder valve of claim 1 wherein said valve stem means has an annular edge contacting said diaphragm member, and wherein said valve stem means is fused to said diaphragm member around said annular edge.

13. The gas cylinder valve of claim 12 wherein said valve stem means comprises a threaded stud which is fused to said diaphragm member and said valve member through said blind bore in said valve member and forming said annular edge which is fused to said diaphragm member, and a stem shaft having a threaded axial bore by which said stem shaft is threaded onto said threaded stud.

14. The gas cylinder valve of claim 13 wherein said threaded axial bore in said stem shaft is counterbored to form an annular rim radially spaced from said threaded stud and which clamps said diaphragm member against said valve member when said stem shaft is threaded onto said threaded stud.

15. The gas cylinder valve of claim 14 wherein said valve stem means includes a plurality of washers between said rim and said diaphragm member and against which said stem shaft is threaded to clamp said diaphragm member against said valve member.

16. A gas cylinder valve for a gas cylinder containing compressed gas, said cylinder valve comprising:

a valve body having an elongated bore forming a valve chamber and a counterbore in said elongated bore forming an annular ledge adjacent said valve chamber, said valve body also having an inlet passage communicating with said valve chamber and aligned with said elongated bore and an outlet passage also communicating with said valve chamber;

a valve member movable in said valve chamber between a closed position in which said valve member seats against said inlet passage, and an open position in which said valve member is spaced from said inlet passage;

a diaphragm member seated on said annular ledge and forming a flexible wall of said valve chamber opposite said inlet passage such that said counterbore is outside said valve chamber;

a bonnet means threadedly engaging said counterbore to clamp said diaphragm member against said annular ledge;

a valve stem reciprocally movable in said counterbore outside said valve chamber and fused to said diaphragm member and said valve member such that said valve stem, said diaphragm member and said valve member move as a one-piece valving assembly between said open and closed positions of said valve member; and spring means in said counterbore outside said valve chamber, engaging said valve stem and biasing said valve member to said open position.

17. The gas cylinder valve of claim 16 wherein said valve stem has a radially outwardly extending shoulder, wherein said bonnet means includes a radially extending shoulder between said radially outwardly extending shoulder on said valve stem and said diaphragm member, and wherein said spring means comprises a compression spring bearing against said radially outwardly extending shoulder on said valve stem and against said radially extending surface on said bonnet means.

18. The gas cylinder valve of claim 17 wherein said bonnet means includes a cup having an end wall forming said radially extending surface against which said compression spring bears, a central aperture through which said valve stem means extends and a peripheral skirt which seats on said diaphragm member, and wherein said bonnet means further includes a bonnet clamping said cup against said diaphragm member seated on said annular ledge.

19. The gas cylinder valve of claim 18 further including a resilient bushing in said cup supporting said diaphragm member.

20. The gas cylinder valve of claim 19 wherein said end wall of said cup has an annular recess facing said diaphragm member and into which said resilient bushing is deformed when said valve stem is actuated to move said valve member to said open position.

* * * * *